US010625165B2

(12) United States Patent
Murakami

(10) Patent No.: US 10,625,165 B2
(45) Date of Patent: Apr. 21, 2020

(54) COMPUTER-READABLE STORAGE MEDIUM AND GAME DEVICE

(71) Applicants: NHN PlayArt Corp., Tokyo (JP); NHN Corporation, Seongnam-si (KR)

(72) Inventor: Haruki Murakami, Tokyo (JP)

(73) Assignees: NHN PlayArt Corp., Tokyo (JP); NHN Corporation, Seongnam-si (KR)

( * ) Notice: Subject to any disclaimer, the term of this patent is extended or adjusted under 35 U.S.C. 154(b) by 0 days.

(21) Appl. No.: 16/113,760

(22) Filed: Aug. 27, 2018

(65) Prior Publication Data

US 2018/0361255 A1  Dec. 20, 2018

Related U.S. Application Data

(63) Continuation of application No. PCT/JP2016/056257, filed on Mar. 1, 2016.

(51) Int. Cl.
*A63F 13/80* (2014.01)
*A63F 13/57* (2014.01)
(Continued)

(52) U.S. Cl.
CPC .......... *A63F 13/80* (2014.09); *A63F 13/2145* (2014.09); *A63F 13/42* (2014.09);
(Continued)

(58) Field of Classification Search
CPC ...... A63F 13/80; A63F 13/2145; A63F 13/42; A63F 13/57; A63F 2300/1075; A63F 2300/64; A63F 2300/8094
See application file for complete search history.

(56) References Cited

U.S. PATENT DOCUMENTS

2003/0040350 A1  2/2003  Nakata et al.
2004/0002380 A1*  1/2004  Brosnan ............. A63F 13/10
463/32
(Continued)

FOREIGN PATENT DOCUMENTS

JP  2006-141453 A  6/2006
JP  2015-54220 A  3/2015
(Continued)

OTHER PUBLICATIONS

International Search Report for corresponding international application PCT/JP2016/056257 dated May 24, 2016, with English translation.
(Continued)

*Primary Examiner* — Werner G Garner
(74) *Attorney, Agent, or Firm* — Hauptman Ham, LLP

(57) ABSTRACT

A game device includes a processor, and a memory having a computer-readable program stored thereon that, when executed by the processor, causes the game device to display a plurality of characters including characters of a plurality of types, determine whether selection of the character(s) is of a first mode or of a second mode based on a signal indicating the selection, and erase the selected character(s) and perform a first process in the case where the selection is determined to be of the first mode, and erase the selected characters and perform a second process in the case where the selection is determined to be of the second mode, the second process including newly displaying a character that has a size in accordance with the size and the number of the erased characters and is of the same type as that of the erased characters.

20 Claims, 22 Drawing Sheets

(51) Int. Cl.
  *A63F 13/42*     (2014.01)
  *A63F 13/2145*   (2014.01)
  *A63F 13/92*     (2014.01)
  *A63F 13/55*     (2014.01)
  *A63F 13/44*     (2014.01)

(52) U.S. Cl.
  CPC ...... *A63F 13/57* (2014.09); *A63F 2300/1075* (2013.01); *A63F 2300/64* (2013.01); *A63F 2300/8094* (2013.01)

(56) References Cited

U.S. PATENT DOCUMENTS

| | | | |
|---|---|---|---|
| 2005/0043075 A1 | 2/2005 | Lin et al. | |
| 2014/0080600 A1* | 3/2014 | Knutsson | G07F 17/32 463/31 |
| 2015/0238861 A1 | 8/2015 | Inamori | |
| 2016/0038831 A1 | 2/2016 | Katou et al. | |

FOREIGN PATENT DOCUMENTS

| | | |
|---|---|---|
| JP | 2016-36613 A | 3/2016 |
| WO | 2014/155414 A1 | 10/2014 |

OTHER PUBLICATIONS

Written Opinion of the International Searching Authority (PCT/ISA/237) for corresponding international application PCT/JP2016/056257 dated May 24, 2016.

"Yo-Kai Watch Wibble Wobble" : Top 10 Tips & Cheats You Need to know, Heavy.com [online], Mar. 25, 2016 [Retrieved on May 16, 2016], pp. 1-9, Retrieved from the Internet: <URL:http://heavy.com/games/2016/03/yo-kai-watch-wibble-wobble-tips-cheats-ios-android-mobile-games/>, cited in NPL No. 1.

English translation of Written Opinion of the International Searching Authority (PCT/ISA/237) for corresponding international application No. PCT/JP2016/056257.

* cited by examiner

COMPUTER-READABLE STORAGE MEDIUM AND GAME DEVICE

CROSS-REFERENCE TO RELATED APPLICATIONS

This application is a U.S. continuation application filed under 35 U.S.C. § 111(a), of International Application No. PCT/JP2016/056257, filed on Mar. 1, 2016, the disclosures of which are incorporated by reference.

FIELD

The present invention relates to a technology controlling a game screen.

BACKGROUND

A so-called "falling block puzzle game" is well known, in which an object falling from above is located at a position satisfying a predetermined condition in a game region to extinguish the object.

The shape or the number of the objects to be handled, and the condition under which the objects are to be extinguished, are varied among games. However, the basic rules are similar to the games, and many games do not provide any surprise.

SUMMARY

A game device includes a processor, and a memory having a computer-readable program stored thereon that, when executed by the processor, causes the game device to display a plurality of characters movable in accordance with a predetermined algorithm, the plurality of characters including characters of a plurality of types, determine whether selection of the character(s) is of a first mode or of a second mode based on a signal indicating the selection upon detection of the signal, the first mode indicating that the same type of character(s) of a number smaller than a predetermined number have been selected, and the second mode indicating that the same type of the characters of a number larger than, or equal to, the predetermined number have been selected, and erase the selected character(s) and perform a first process in the case where the selection is determined to be of the first mode, and erase the selected characters and perform a second process in the case where the selection is determined to be of the second mode, the first process being performed in accordance with the size and the number of the erased character(s), the second process including newly displaying a character that has a size in accordance with the size and the number of the erased characters and is treated as being of the same type as that of the erased characters.

DESCRIPTION OF EMBODIMENTS

Figure 1:
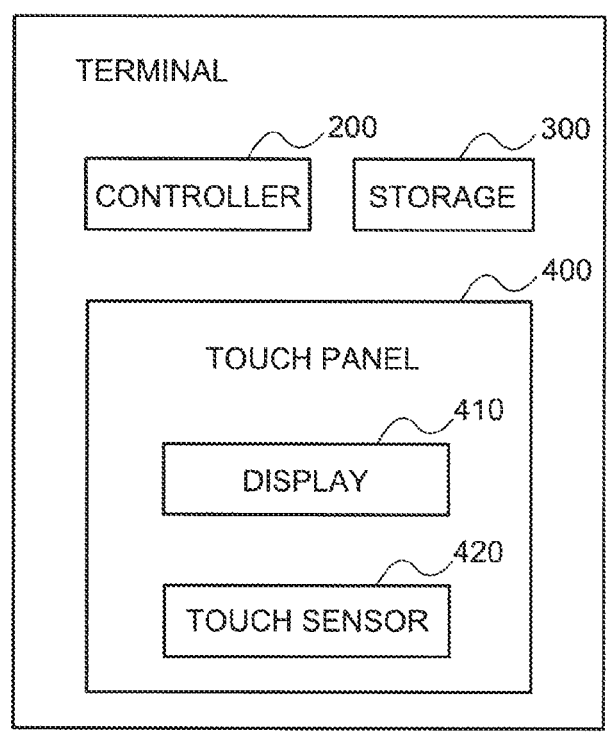
FIG. 1 shows a hardware structure of a game device in an embodiment according to the present invention.

Hereinafter, embodiments of the present invention will be described with reference to the drawings and the like. The present invention may be carried out in many different forms, and should not be construed as being limited to any of the following embodiments. In the drawings, components may be shown schematically regarding the width, thickness, shape and the like, instead of being shown in accordance with the actual sizes, for the sake of clearer illustration. The drawings are merely examples and do not limit the interpretations of the present invention in any way. In the specification and the drawings, components that are substantially the same as those described before with reference to a previous drawing(s) bear the identical reference signs thereto, and detailed descriptions thereof may be omitted.

In the specification, regarding the positional relationship between two components, an expression that one component or region is "on" the other component or region encompasses a case where the one component or region is in direct contact with the other component or region and also a case where the one component is above or below the other component or region, namely, a case where another component or region is provided between the one component or region and the other component or region, unless otherwise specified.

<Hardware Structure of the Game Device 100>

FIG. 1 is a block diagram showing a hardware structure of a game device 100 in this embodiment. The game device 100 in this example is a computer such as a smartphone. The game device 100 may be, for example, a mobile phone, a mobile game machine or the like. The game device 100 is not limited to being a mobile terminal and may be a non-portable terminal.

As shown in FIG. 1, the game device 100 includes a controller 200, a storage 300 and a touch panel 400. Although not shown in FIG. 1, the game device 100 may include a component usually included in a terminal such as a smartphone or the like, for example, an operation button, a microphone, a speaker, a memory card slot, a headphone or the like.

The controller 200 includes an arithmetic processing circuit (processor) such as a CPU or the like, a memory and the like. The controller 200 executes a program stored on the storage 300 to realize various functions in the terminal. The program encompasses an application allowing a game to be executed.

Such a program is downloaded to the terminal via a network and stored on the storage 300. The program may be provided as being stored on a non-transitory computer-readable storage medium such as a magnetic storage medium, an optical storage medium, an opto-magnetic storage medium, a semiconductor memory or the like. In this case, the game device 100 merely needs to include a device reading the data on the storage medium. Alternatively, the program may be stored on the storage 300 in advance.

The storage 300 is a storage device such as a nonvolatile memory, a hard disc or the like. A program as described above is stored on the storage 300.

The touch panel 400 includes a display 410 and a touch sensor 420. The display 410 is a display device such as a liquid crystal display device, an organic EL display device or the like, and is controllable by the controller 200 to display any of various screens such as a chat screen, a game screen or the like.

The touch sensor 420 is a device accepting an input operation made by a user to output a signal in accordance with the input operation. The input operation made by the user is a touch of, for example, a pointing device such as a stylus pen or the like or a finger of the user, and is accepted by the touch sensor. In the following description, an input operation such as an act of a finger of the user touching a position corresponding to the operation button displayed on the display will be simply expressed as that "the user operates the operation button".

<Example of Display Screen>

Figure 2:
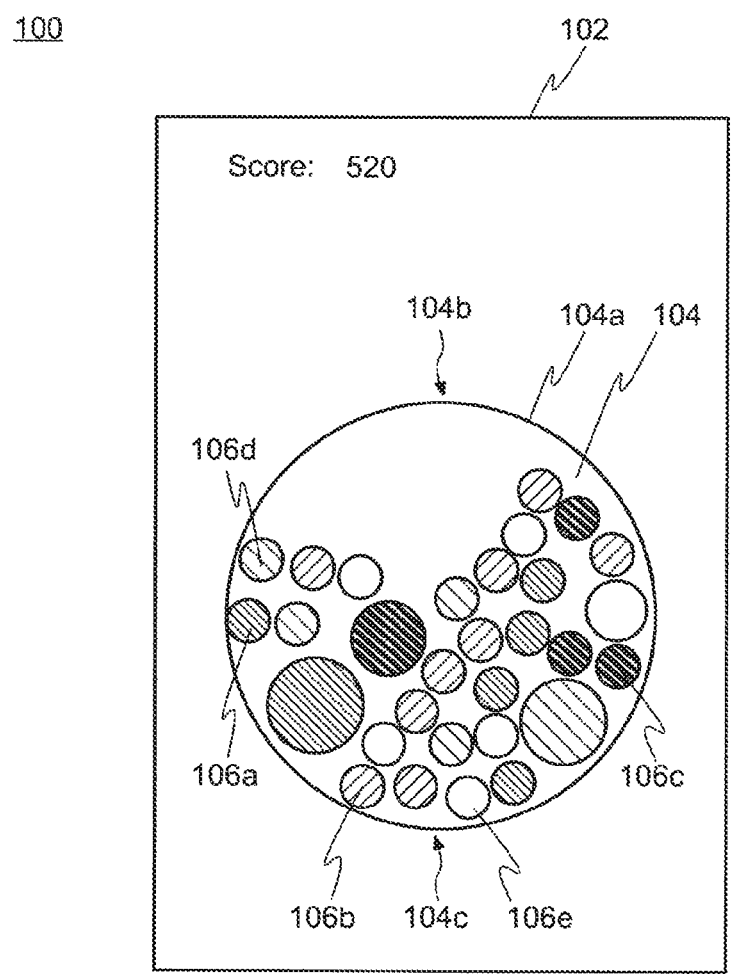
FIG. 2 shows an example of game screen in an embodiment according to the present invention.

FIG. 2 shows an example of a display screen 102 displayed on the display 410 by execution of a game program in an embodiment according to the present invention.

The display screen 102 of the game device 100 displays a movable region 104 and a plurality of characters 106.

The movable region 104 is displayed in the vicinity of the center of the display screen 102. In this embodiment, the movable region 104 displayed on the display screen 102 is circular.

The plurality of characters 106 move in accordance with a predetermined algorithm. The plurality of characters 106 move in a predetermined region. In this embodiment, the predetermined region corresponds to the movable region 104 shown in FIG. 2.

The predetermined algorithm may include, for example, a process of providing a gravitational force from a first side 104b toward a second side 104c of the movable region 104 to move the plurality of characters 106. In this embodiment, the plurality of characters 106 are displayed as moving in accordance with laws of physics while being attracted in a gravitational field from a top portion (first side 104b) of the display screen 102 toward a bottom portion (second side 104c) of the display screen 102. The direction of the gravitational force is not limited to a direction from top to bottom, and may be any direction. The gravitational field is not limited to a spatially uniform gravitational field as described above, and may be a central force field centered around any one point in the display screen 102. The direction of the gravitational force and the gravitational field may be settable by the user or may be set in advance.

Each of the plurality of characters may have a plurality of sizes. The plurality of characters may each have any of a plurality of discrete sizes, as described below in detail. The minimum size that may be assumed by the plurality of characters 106 will be referred to as a "unit size". The plurality of characters 106 may be assumed to be rigid or elastic. In this embodiment, the plurality of characters are assumed to be elastic.

The predetermined algorithm may further include a process in which a mutual action is provided between any two of the plurality of characters 106 and between each of the plurality of characters 106 and a frame 104a of the movable region 104. In this embodiment, the plurality of characters 106, when colliding against each other, are displayed as elastically repelling against each other in accordance with a predetermined repellence coefficient and changing the moving direction. At this point, the characters 106 involved in the collision may be elastically deformed.

Parameters such as the magnitude of the gravitational force acting on each of the plurality of characters 106, the mass of each of the plurality of characters 106 and the like may be appropriately adjusted. A resistance against the movement of each of the plurality of characters 106 may be considered. For example, a resisting force in proportion to the moving rate of each of the plurality of characters 106 may be supplied.

In this embodiment, various parameters are set such that in the case where no process of erasure, synthesis or the like described below is performed on the plurality of characters 106, the plurality of characters 106 become still within a limited time period in accordance with a set algorithm.

The plurality of characters 106 includes a plurality of types of characters. In this embodiment, five types of characters 106a to 106e are displayed, and a plurality of characters 106 of each of the five types are displayed in the movable region 104. The characters that are different from each other in only the size are treated as being of the same type of characters. In the following description, in the case where the types of the characters are not to be distinguished from each other, the expression "characters 106" will be used.

In this embodiment, the plurality of characters 106 are spherical, and the five types of characters 106 are distinguished from each other by pattern. Needless to say, the shapes or the patterns of the plurality of characters 106 are not limited to those shown in the figure. For example, the shapes or the patterns of the plurality of characters 106 may be selected from various types of characters such as blocks, eggs, animals, monsters, fairies and the like.

The number of types of the characters 106 is not limited to five. As can be seen from the description below, as the number of the types of the characters 106 is increased, the difficulty level of the game is increased. As the number of the types of the characters 106 is decreased, the difficulty level of the game is decreased.

<Basic Operation>

A basic operation of the game device 100 in this embodiment will be described with reference to the drawings.

The user repeats an operation of selecting at least one character 106. The "operation of selecting at least one character 106" refers to that the at least one character 106 on the display screen 102 is designated by an input operation made by the user, and a signal output in accordance with the input operation is detected by the controller 200.

The "input operation made by the user" may be an operation accepted by the touch sensor 420, for example, a touch of a pointing device such as a stylus pen or the like or a finger of the user.

In this embodiment, an input operation, made by the user, of tapping the position corresponding to a character 106 displayed on the display 410 of performing a drag operation along the positions corresponding to characters 106 displayed on the display 410 is expressed as an "operation of selection". In the case where, for example, the user is to select one character 106, the user taps the character 106 to select the character 106. By contrast, in the case where the user is to select a plurality of characters 106, the user touches one of the plurality of characters with his/her finger and drags the finger along the positions of the other characters 106, and when the position of the last character 106 to be selected is reached, lifts the finger. In this manner, the plurality of characters 106 are selected.

When the controller 200 detects a signal indicating selection of a character 106, the controller 200 determines whether the selection is of a first mode or of a second mode based on the signal.

The "first mode" indicates that the same type of characters 106 of a number smaller than a predetermined number have been selected. The "second mode" indicates that the same type of characters 106 of a number larger than, or equal to, the predetermined number have been selected.

Hereinafter, a process performed by the game device 100 will be described with reference to the drawings in the case where the selection is determined to be of the first mode and in the case where the selection is determined to be of the second mode.

In this embodiment, the predetermined number is 2. Namely, when a signal indicating selection of one character 106 is detected, the selection is determined to be of the first mode. When a signal indicating selection of two or more characters 106 is detected, the selection is determined to be of the second mode.

FIG. 3A to FIG. 3E each show an example of game screen.

Figure 3A:
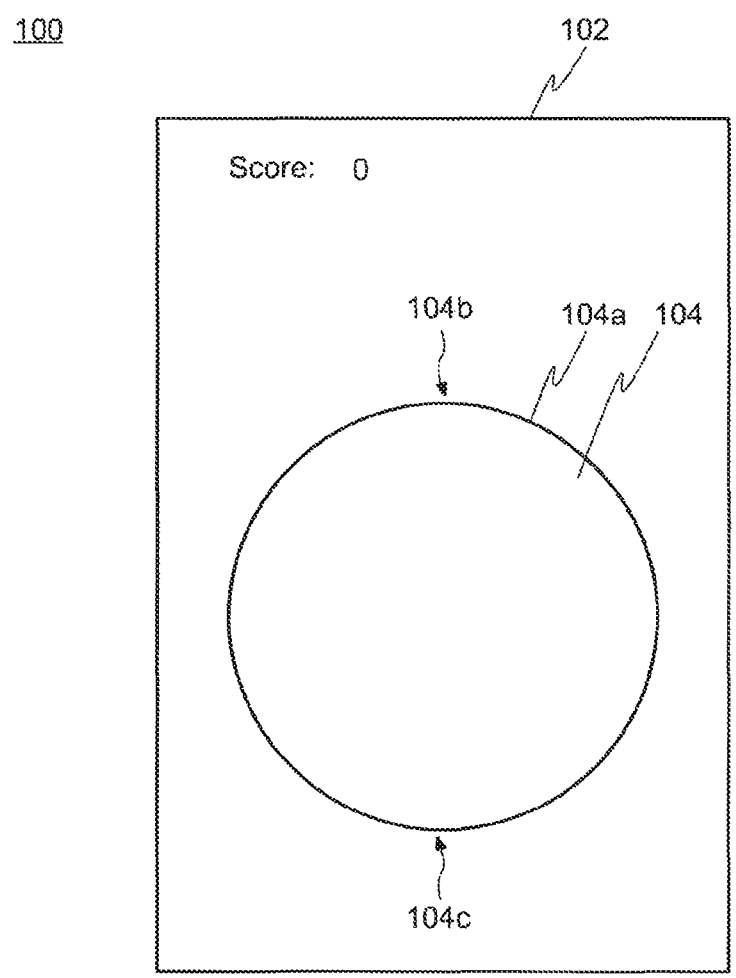
FIG. 3A shows an example of game screen in an embodiment according to the present invention.

FIG. 3A shows the display screen 102 when the game is started. In this embodiment, the movable region 104 is empty when the game is started, and no character 106 is displayed.

Figure 3B:
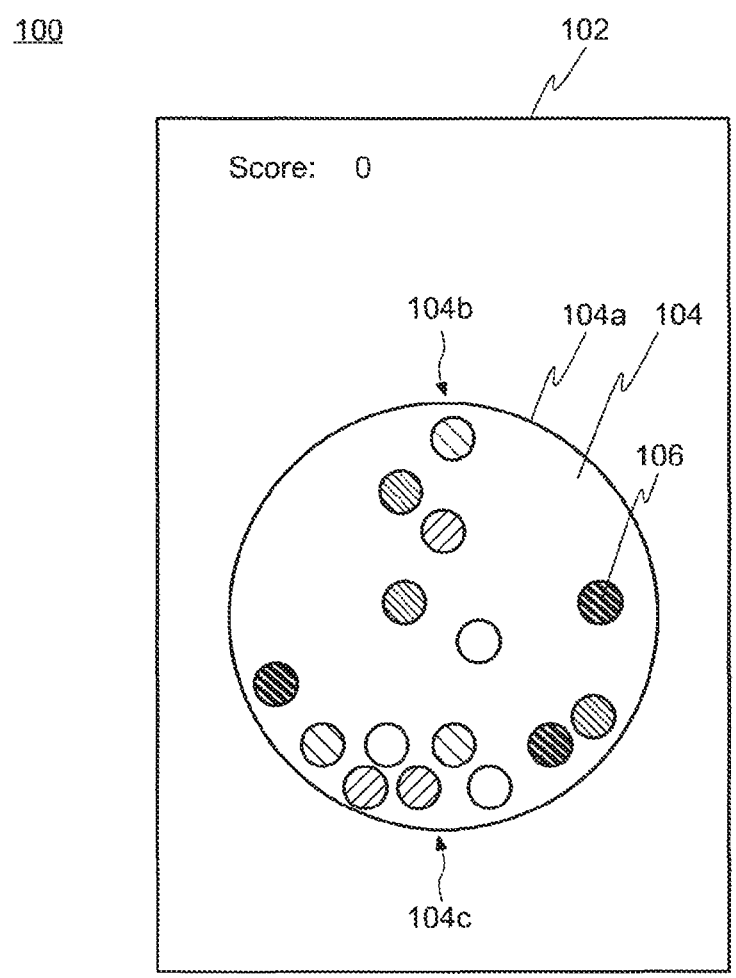
FIG. 3B shows an example of game screen in an embodiment according to the present invention.

FIG. 3B shows the display screen 102 immediately after the game is started. In this embodiment, a predetermined number of characters 106 are supplied from the first side 104b of the movable region 104 immediately after the game is started. At this point, the predetermined number of characters 106 fall to the second side 104b of the movable region 104 in accordance with a gravitational force that attracts the characters 106 from the first side 104b toward the second side 104c. The predetermined number of characters 106, which have fallen, are piled up from the second side 104c and move while elastically repelling against each other, being elastically deformed and falling in accordance with the gravitational force in repetition.

In this embodiment, the movable region 104 is empty when the game is started. The present invention is not limited to such a form. A number of character(s) 106 in accordance with, for example, the level of the user, the difficulty level set in advance or the like may be supplied when the game is started.

In this embodiment, the characters 106 supplied immediately after the game is started are all regarded as having the same size. The size of the characters 106 supplied immediately after the game is started is set as a "unit size".

In this embodiment, the characters 106 supplied immediately after the game is started all have the unit size. The present invention is not limited to such a form. A plurality of sizes of characters 106 may be supplied in accordance with the level of the user, the difficulty level set in advance or the like.

When the game is started, the user may select at least one character 106. Hereinafter, a process performed by the game device 100 after the user selects a character 106 will be described in detail.

Figure 3C:
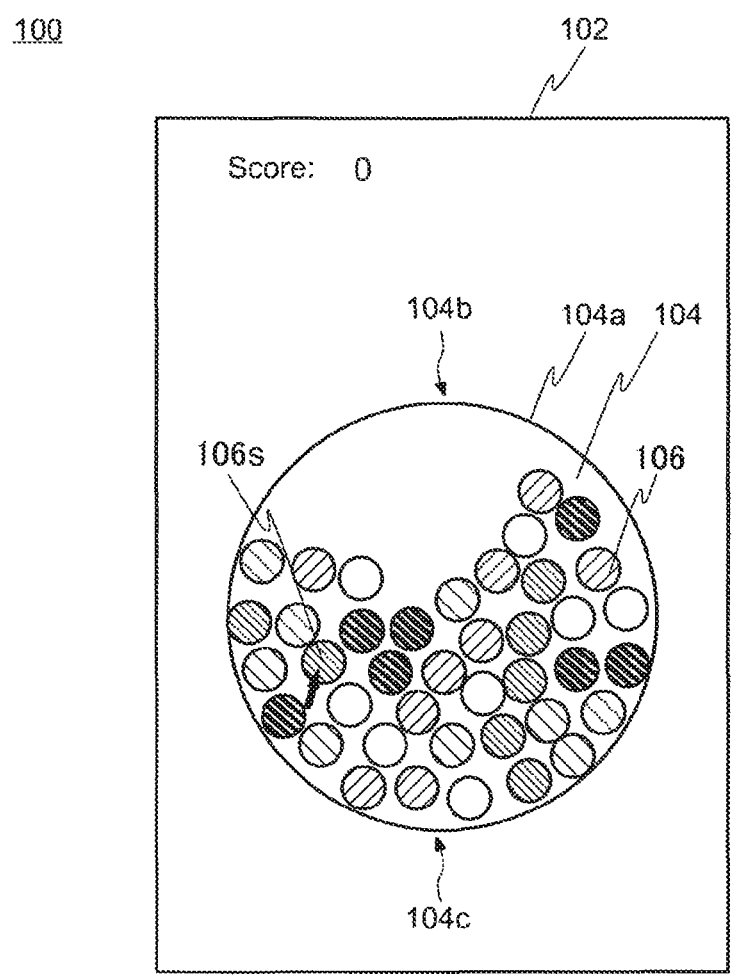
FIG. 3C shows an example of game screen in an embodiment according to the present invention.

FIG. 3C shows that a signal indicating that the user has selected a character 106 is detected.

In this example, it is shown that one character 106s represented by the arrow in the figure has been selected. The user taps the one character 106s on the display screen 102 to select the character 106s.

As described above, in this embodiment, when a signal indicating that one character 106 has been selected is detected, the selection is determined to be of the first mode. When a signal indicating that two or more characters 106 of the same type have been selected is detected, the selection is determined to be of the second mode. In this example, a signal indicating that only one character 106s has been selected is detected, the selection is determined to be of the first mode.

Figure 3D:
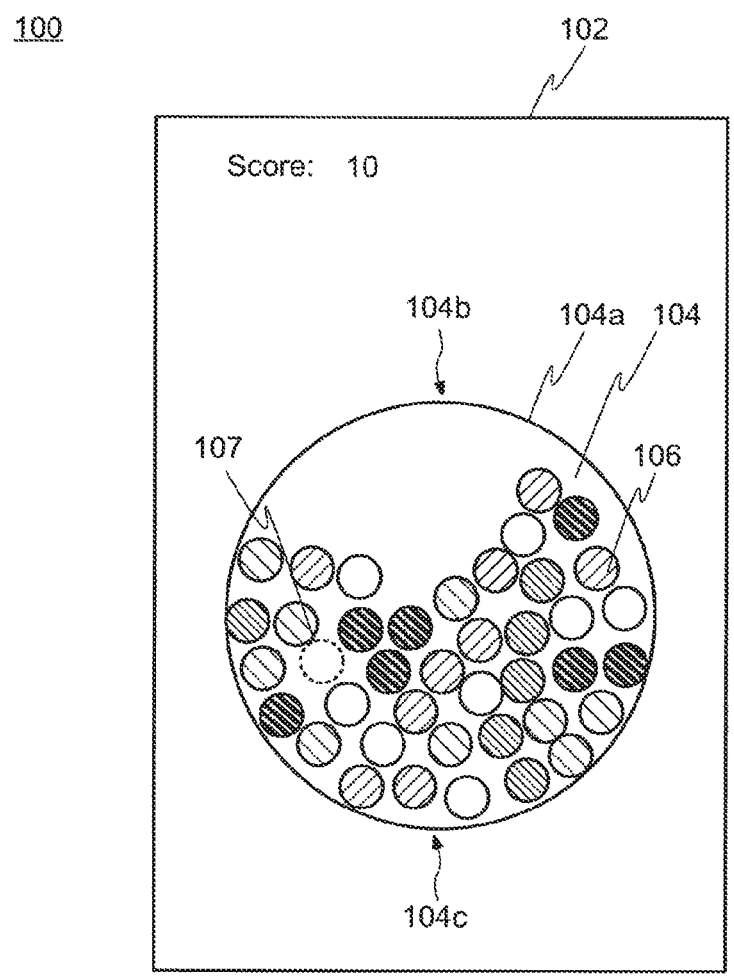
FIG. 3D shows an example of game screen in an embodiment according to the present invention.
Figure 3E:
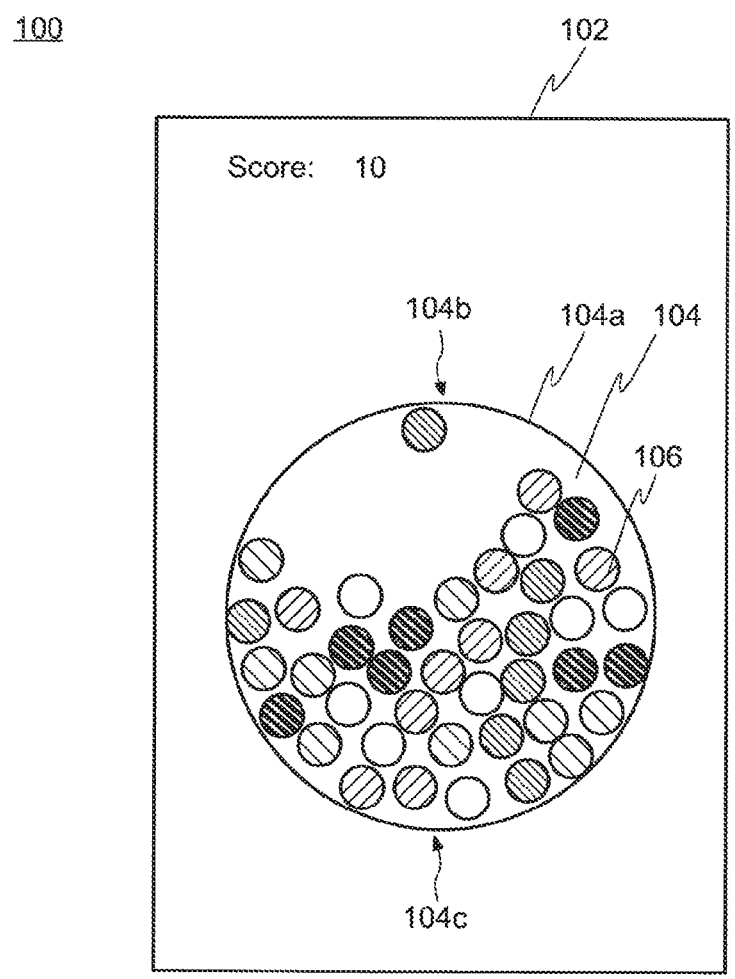
FIG. 3E shows an example of game screen in an embodiment according to the present invention.

FIG. 3D and FIG. 3E show a process performed when the selection made by the user is determined to be of the first mode.

When determining that the selection made by the user is of the first mode, the controller 200 first erases the selected character 106s (FIG. 3D), and then performs a first process.

The first process is a process in accordance with the size and the number of the character 106s. The "process in accordance with the size and the number of the character 106s" may be, for example, a process of adding a point in accordance with the size and the number of the character 106s. For example, as the size of the selected character(s) 106s is larger and the number of the selected character(s) 106s is larger, the point to be added may be higher. In this example, the size of the selected character 106s is the unit size and the number of the selected character 106s is one. Therefore, the point to be added in the first process may be the lowest point.

When the selected character 106s is erased, a space 107 is generated in a region occupied by the character 106s. When such a space 107 is generated, the plurality of characters 106 remaining in the movable region 104 start moving along with such a change in the positional arrangement thereof in accordance with a set algorithm.

The first process performed in the case where the selection made by the user is determined to be of the first mode may further include supplying a character(s) 106 as a supplement(s) in accordance with the number of the erased character(s) 106s (FIG. 3E).

For example, a character(s) 106 of the same number as that of the erased character(s) 106 may be newly supplied as a supplement(s). There is no specific limitation on the type of the character(s) 106 to be supplied. For example, a character(s) 106 of the same type as that of the erased character(s) 106s may be supplied, or a character(s) of a randomly selected type may be supplied. The new supply of the character(s) 106 may be supply of a character(s) 106 from the first side 104b. The character(s) 106 newly supplied from the first side 104b fall(s) toward the second side 104c in accordance with a set gravitational force.

FIG. 4A to FIG. 4E show another example of the display screen 102.

Figure 4A:
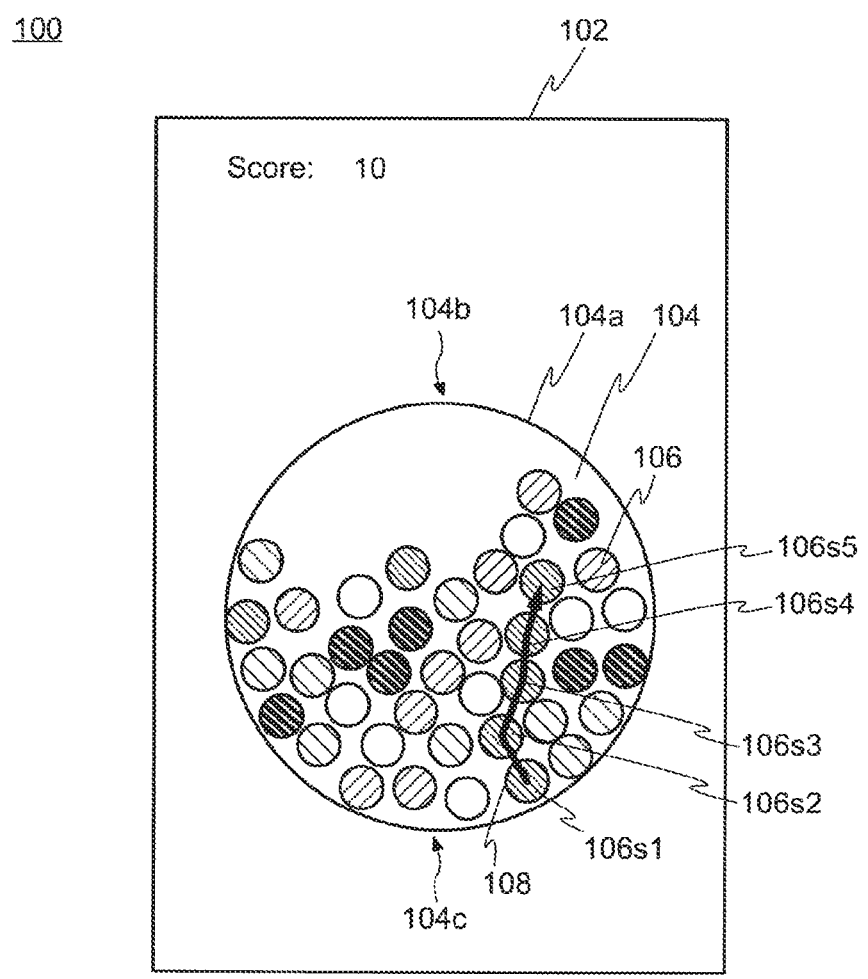
FIG. 4A shows an example of game screen in an embodiment according to the present invention.

FIG. 4A shows that in a state immediately after the state in FIG. 3E, a signal indicating that the user has selected five characters 106s1 to 106s5 is detected by the game device 100.

In this example, the five characters 106s1 to 106s5 of the same type have been selected. The user may touch the character 106s1 on the display screen 102 and perform a drag operation along the five characters 106 to the character 106s5 to select the five characters 106s1 to 106s5. A bent line 108 shows a track indicating the order in which the characters 106 have been selected, and is displayed along with the drag operation.

As described above, in this embodiment, when a signal indicating that one character 106 has been selected is detected, the selection is determined to be of the first mode. When a signal indicating that two or more characters 106 of the same type have been selected is detected, the selection is determined to be of the second mode. In this example, a signal indicating that the five characters 106s1 to 106s5 have been detected is detected. Therefore, the selection is determined to be of the second mode.

Figure 4B:
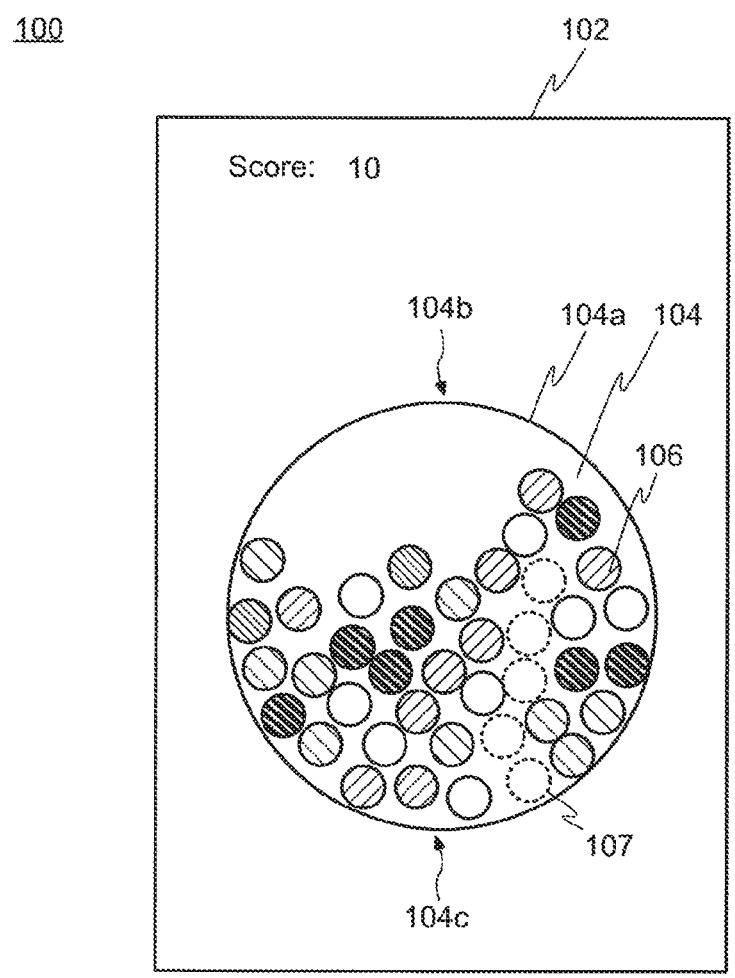
FIG. 4B shows an example of game screen in an embodiment according to the present invention.
Figure 4C:
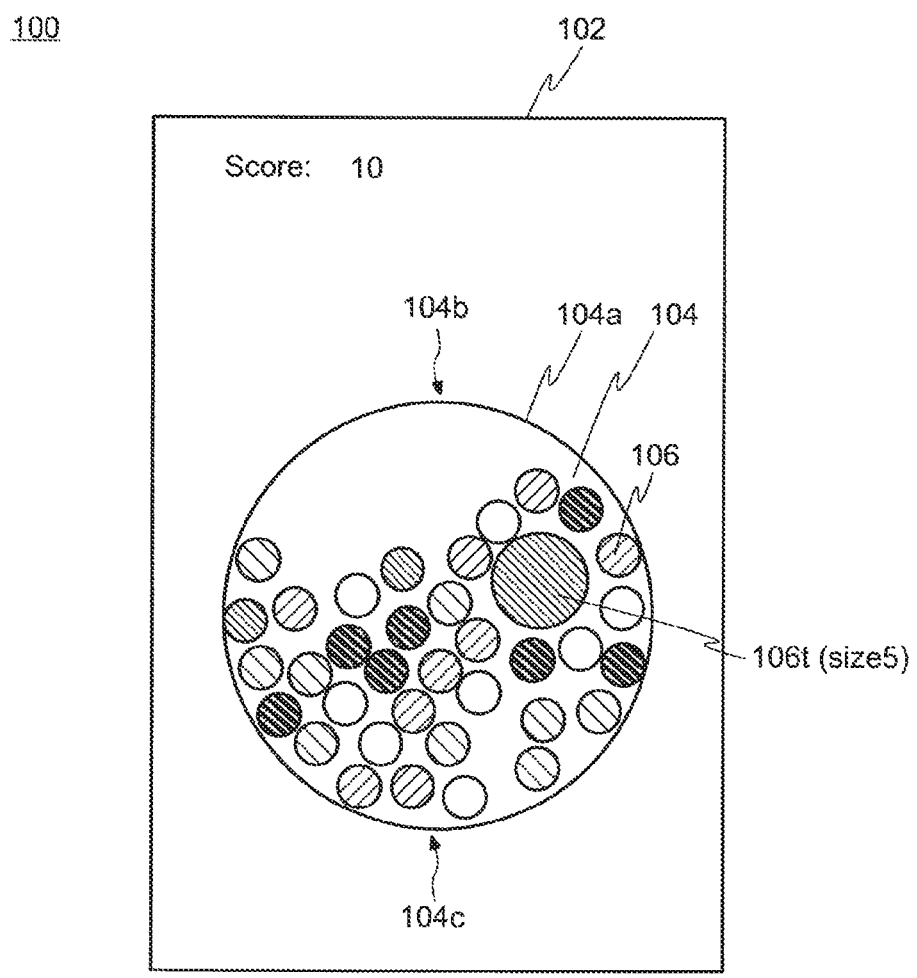
FIG. 4C shows an example of game screen in an embodiment according to the present invention.

FIG. 4B and FIG. 4C show a process performed when the selection made by the user is determined to be of the second mode.

When determining that the selection made by the user is of the second mode, the controller 200 first erases the selected characters 106s1 to 106s5 (FIG. 4B), and then performs a second process. The second process includes newly displaying a character 106t, which has a size in accordance with the size and the number of the characters 106s1 to 106s5 and is treated as being of the same type as that of the characters 106s1 to 106s5 (FIG. 4C).

The "size in accordance with the size and the number of the characters 106" will be described.

In the case where, for example, the selected characters 106 are of N number (N is an integer of 2 or greater) and of the unit size, the size of the character 106 to be newly displayed is set as "size N". In this case, the unit size is size 1.

In the following description, "selecting" N number of characters 106 may be rephrased as "coupling N number of characters" or "synthesizing N number of characters 106".

In this embodiment, five characters 106 of the unit size are coupled together and the character 106t of size 5 is displayed. In this embodiment, the newly displayed character 106t of size 5 is spherical, and is displayed as having a radius of a value obtained by multiplying the radius of the character 106 of size 1 (unit size) by a square root of 5. As a result, the area size occupied by the plurality of characters 106 in the movable region 104 is made the same as that before the characters 106s1 to 106s5 are erased.

As a result of this process, the characters present before this process move as being pushed, by the newly display character 106t of size 5, to an area around the character 106t. The characters 106 present before this process move to fill the space 107 generated by the erasure of the characters 106s1 to 106s5.

The above description is regarding the case where the plurality of selected characters 106 are all of size 1 (unit size). In the case where the plurality of selected characters 106 include a character 106 of a size different from size 1, a character 106 having a size that is a sum of the sizes of the selected characters may be displayed. In the case where, for example, the user selects three characters 106 of size 2, size 3 and size 5, the character to be newly displayed after these characters are erased may have size 10 (=2+3+5).

A signal to be detected when the plurality of characters 106 have been selected is output by continuously designating the same type of characters 106 regarded as being adjacent to each other. The expression "regarded as being adjacent to each other" is not limited to indicating that the same type of two characters 106 are in contact with each other.

For example, the expression "regarded as being adjacent to each other" may indicate that the distance between the two characters 106 may be within a predetermined distance. The "distance between the two characters 106" may be, for example, the shortest distance between the two characters 106 or the distance between the centers of the two characters 106.

An example of position of the character 106t to be newly displayed will be described. The character 106t to be newly displayed may be displayed at a position determined based on the position of the last character 106s5 selected by the signal based on which the selection is determined to be of the second mode. For example, the character 106t to be newly displayed may be displayed as positionally matching the center of gravity of the last character 106s5 selected.

Alternatively, the character 106t to be newly displayed may be displayed at a position determined based on the position of the first character 106s1 selected by the signal based on which the selection is determined to be of the second mode, or may be displayed at a position determined based on the positions of the five characters 106s1 to 106s5 selected by the signal based on which the selection is determined to be of the second mode.

Figure 4D:
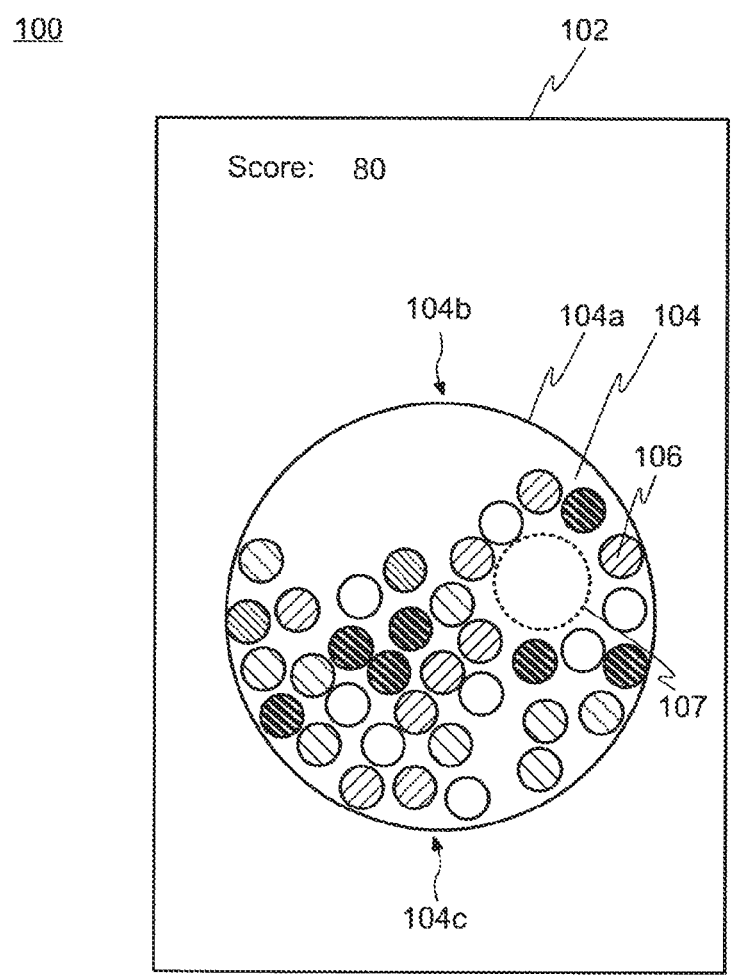
FIG. 4D shows an example of game screen in an embodiment according to the present invention.

FIG. 4D shows that a signal indicating that the user has selected the newly selected character 106t shown in FIG. 4C is detected by the controller 200.

In the example of FIG. 4D, a signal indicating that only one character 106t has been selected is detected. Therefore, the selection is determined to be of the first mode. Thus, the selected character 106t is erased as shown in the figure. Then, the first process is performed. The first process is a process in accordance with the size and the number of the character 106t as described above.

The "process in accordance with the size and the number of the character 106t" may be, for example, a process of adding a point in accordance with the size and the number of the character 106t. For example, as the size of the selected character 106t is larger, the point to be added may be higher.

In this example, the size of the selected character 106t is size 5. By contrast, in the example shown FIG. 3C, one character 106s of size 1 (unit size) is selected. In the example shown in FIG. 4D, it is preferred to add a point higher than a value obtained by multiplying the point added in FIG. 3C by 5. In this manner, the user is motivated to synthesize the characters 106 treated as being of the same type.

Such an operation of synthesizing the characters 106 treated as being of the same type is not proposed in any conventionally known puzzle game and provides a surprise.

As a result of the selected character 106t being erased, the space 107 is generated in a region occupied by the character 106t. As described above, when such a space 107 is generated, the plurality of characters remaining in the movable region 104 start moving along with such a change in the positional arrangement thereof in accordance with laws of physics.

Figure 4E:
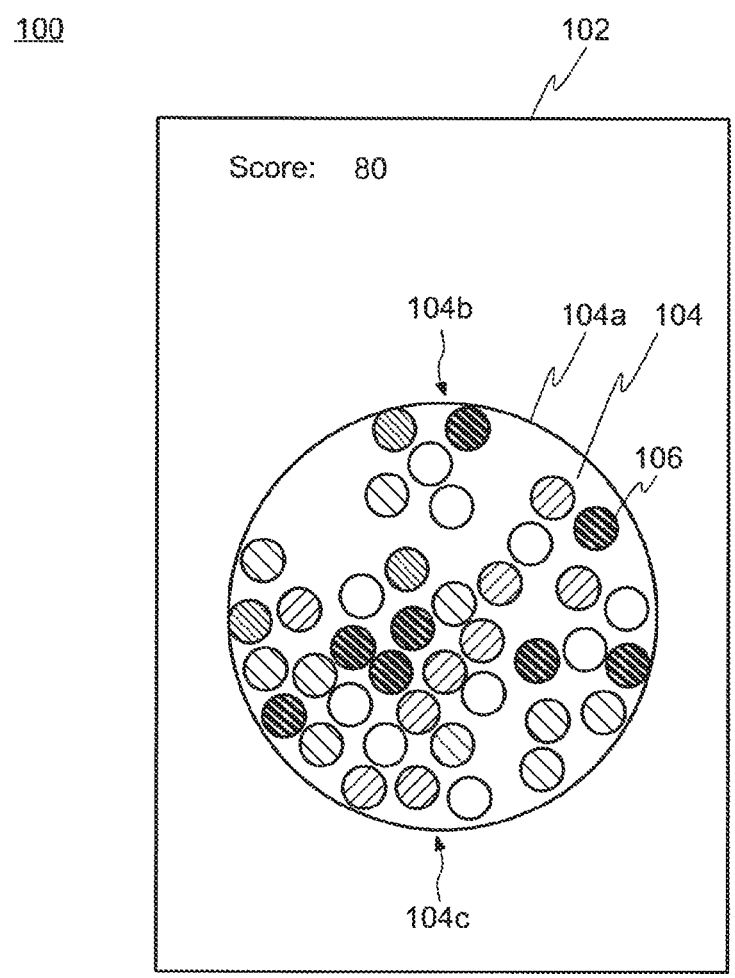
FIG. 4E shows an example of game screen in an embodiment according to the present invention.

FIG. 4E shows that the character 106 is supplied. In the first process, a character(s) 106 of the same number as that of the erased character(s) 106*t* may be newly supplied as a supplement(s). In this embodiment, five characters 106 are supplied from the first side 104*b*. There is no specific limitation on the type of the characters 106 to be supplied. For example, characters 106 of the same type as that of the erased character 106*t* may be supplied, or characters of a randomly selected type may be supplied.

FIG. 5A to FIG. 5E show still another example of game screen.

Figure 5A:
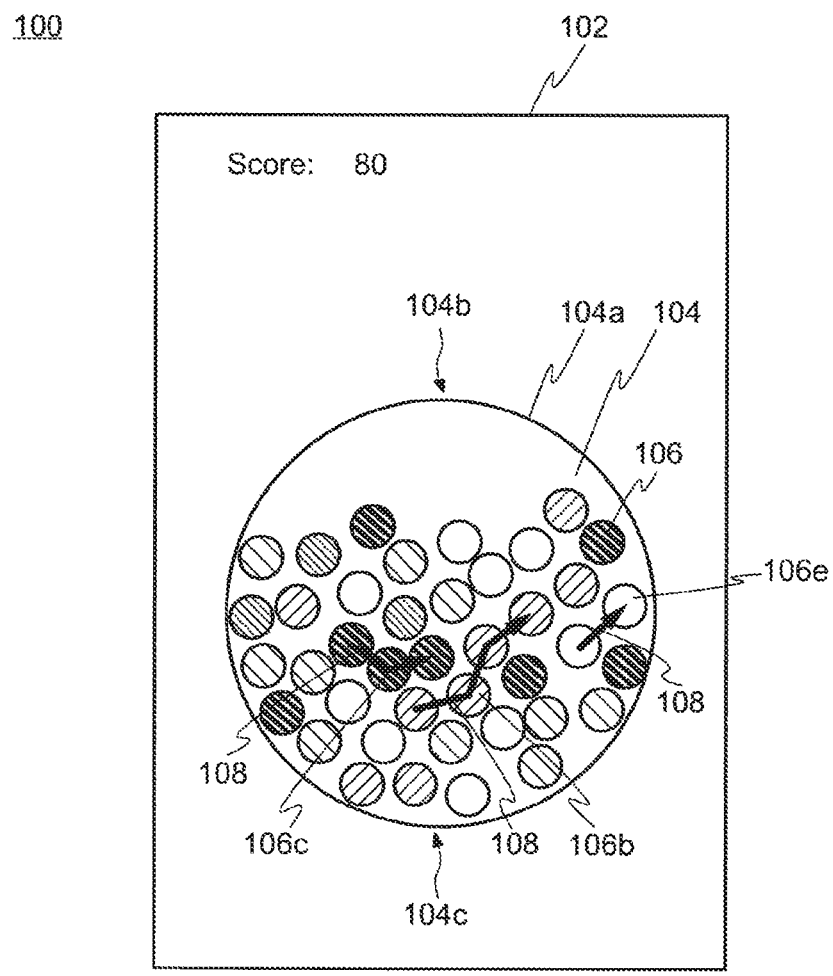
FIG. 5A shows an example of game screen in an embodiment according to the present invention.

FIG. 5A shows a state where the user has made a selection determined to be of the second mode three times. Namely, the user has selected three characters 106*c* of the unit size, four characters 106*d* of the unit size, and two characters 106*e* of the unit size independently. The second process is performed on each of the three selections.

Figure 5B:
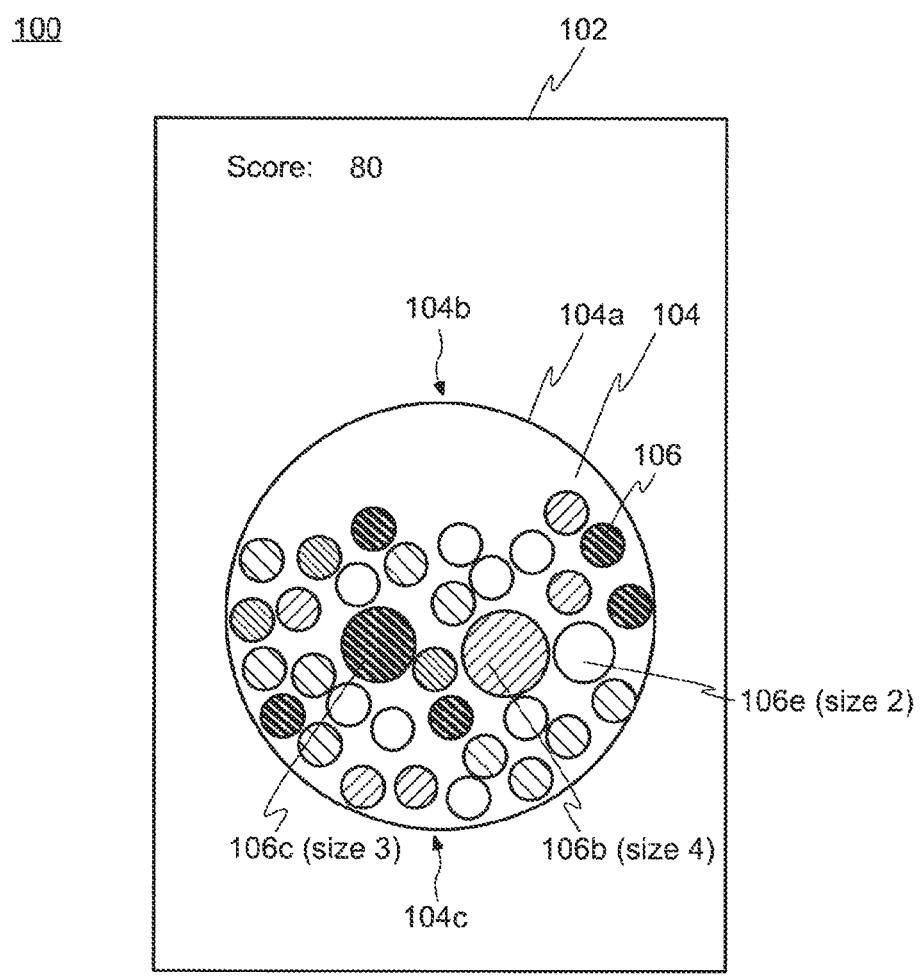
FIG. 5B shows an example of game screen in an embodiment according to the present invention.

FIG. 5B shows a state where the second process has been performed on each of the three selections. Namely, the three characters 106*c* of the unit size have been erased, and a character 106*c* of size 3 is newly displayed. The four characters 106*b* of the unit size have been erased, and a character 106*b* of size 4 is newly displayed. The two characters 106*e* of the unit size have been erased, and a character 106*e* of size 2 is newly displayed.

Figure 5C:
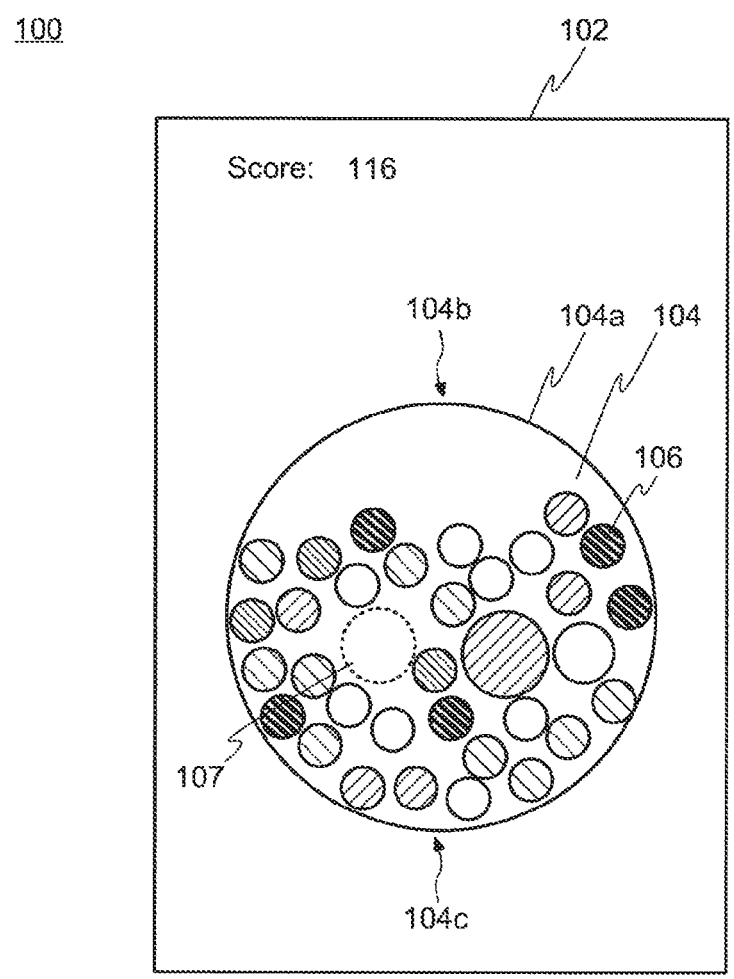
FIG. 5C shows an example of game screen in an embodiment according to the present invention.
Figure 5D:
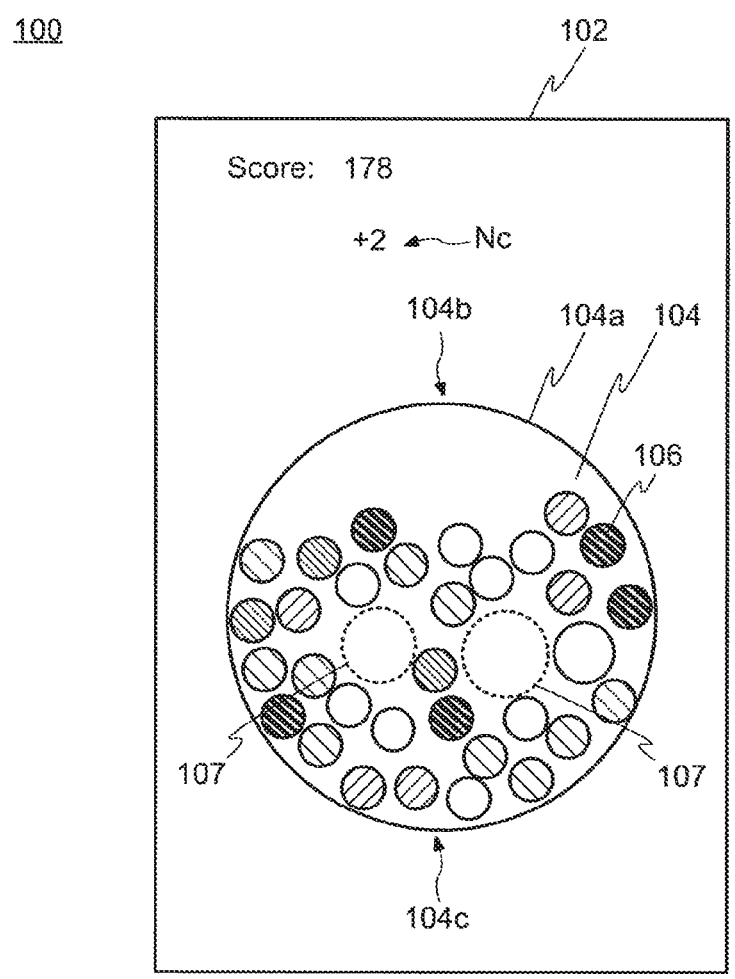
FIG. 5D shows an example of game screen in an embodiment according to the present invention.
Figure 5E:
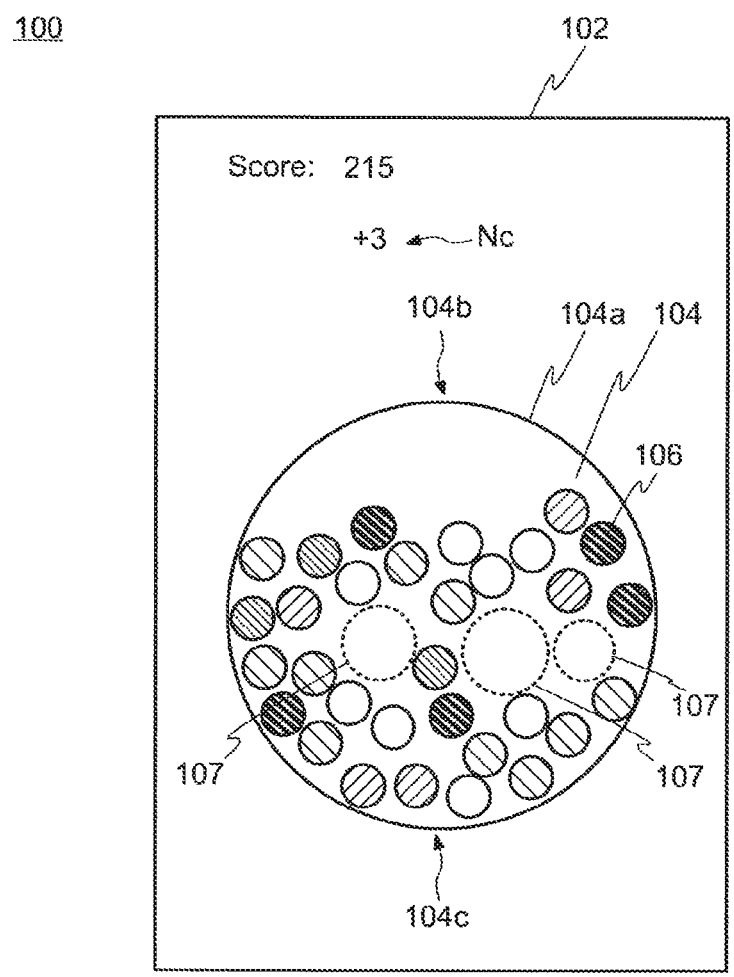
FIG. 5E shows an example of game screen in an embodiment according to the present invention.

FIG. 5C to FIG. 5E shows a state where a signal indicating that each of the three synthesized characters 106 has been selected has been detected, and each of the three characters 106 has been erased. The two signals detected continuously are detected within a predetermined time period. Specifically, the controller 200 detects a signal indicating that the character 106*c* has been selected (FIG. 5C). Within a predetermined time period after this detection, the controller 200 detects a signal indicating that the character 106*b* has been selected (FIG. 5D). Within a predetermined time period after this detection, the controller 200 detects a signal indicting that the character 106*e* has been selected (FIG. 5E). Within a predetermined time period after this detection, no signal indicating that any character 106 has been selected is detected.

Each of the selections is regarded as being of the first mode. As described above, each of the characters 106 is erased and the first process is performed.

In the case where, as in this example, a plurality of signals, an interval between each two continuous signals of which is within a predetermined time period, are detected and the selections are each determined to be of the first mode based on each of the plurality of signals, a third process described below is performed.

The third process is a process in accordance with the "number Nc of the plurality of detected signals" and the "size of the selected characters 106".

First, an example of process in accordance with the "number Nc of the plurality of detected signals" will be described. In this embodiment, the number Nc of the plurality of signals detected at the time of FIG. 5D is 2, and the number Nc of the plurality of signals detected at the time of FIG. 5E is 3 as a result of 1 being added. The number of the plurality of detected signals are shown in the display screen 102, below "Score". This indicates that three signals, the interval between each two continuous signals of which is within a predetermined time period, have been detected.

In the case where, for example, Nc is 2 or greater, as the value of Nc is larger, the point to be added may be higher.

In this example, a point in accordance with the value of Nc of 2 is added at the time of FIG. 5D, and a point in accordance with the value of Nc of 3 is added at the time of FIG. 5E.

Now, an example of process in accordance with "the size of the selected characters 106" will be described. In this embodiment, the third process is performed in the case where the plurality of selected characters 106 do not include a character 106 of size 1.

In such a situation, the user is motivated to prepare a plurality of characters 106 having an increased size as a result of synthesizing the characters 106 regarded as being of the same type and to select and erase the plurality of characters 106 quickly within a predetermined time period.

Such an operation of preparing a plurality of characters 106 having an increased size and selecting and erasing the plurality of characters 106 within a predetermined time period is not proposed in any conventionally known puzzle game and provides a surprise.

The third process is not limited to being performed in the above-described examples, and may be performed in the case where the plurality of selected characters 106 include at least one character 106 having size 2 or greater.

Figure 5F:
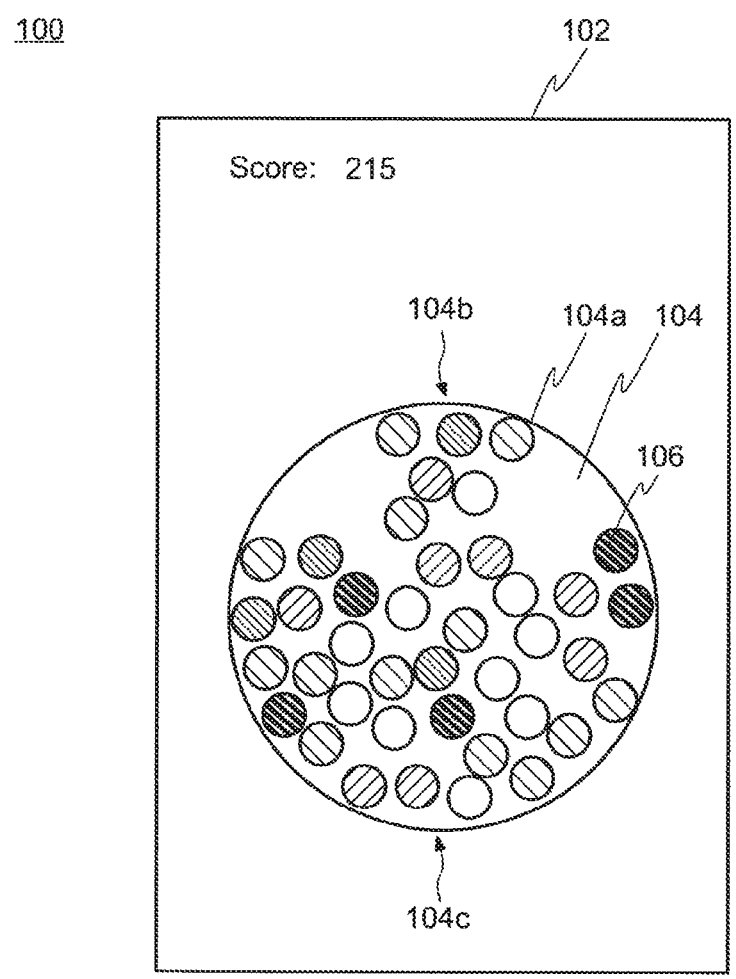
FIG. 5F shows an example of game screen in an embodiment according to the present invention.

FIG. 5F shows that the characters 106 are supplied. In this embodiment, 9 characters of the unit size have been erased by the first process performed three times. Therefore, 9 characters 106 are supplied as supplements from the first side 104*b*.

Figure 6A:
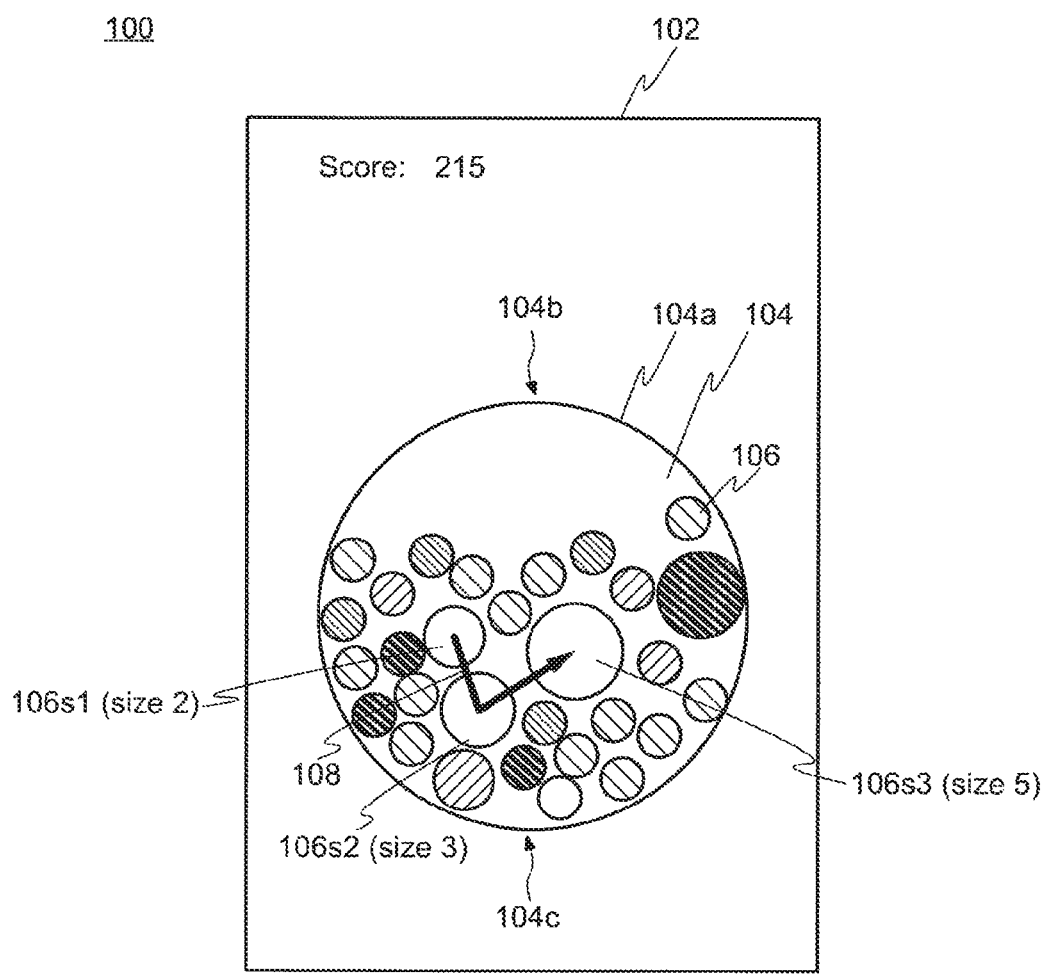
FIG. 6A shows an example of game screen in an embodiment according to the present invention.
Figure 6B:
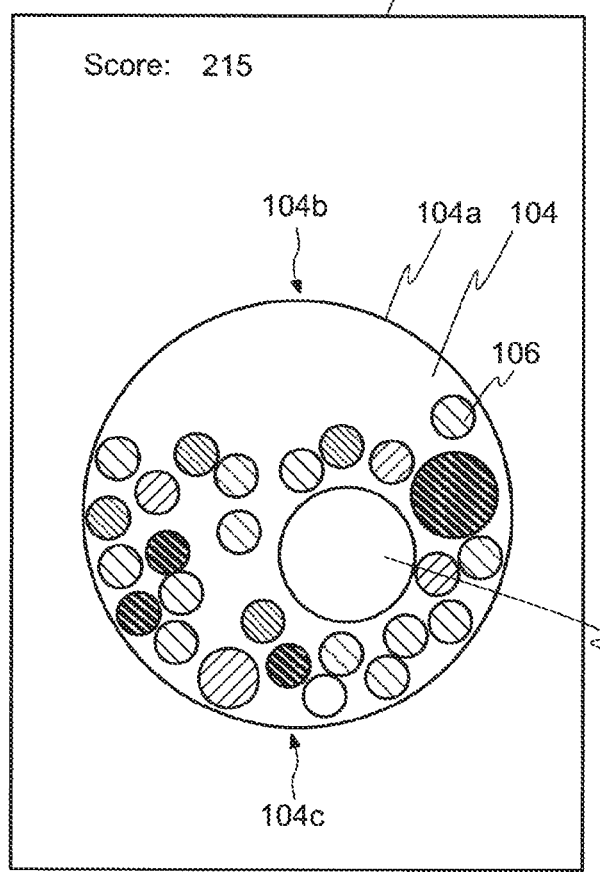
FIG. 6B shows an example of game screen in an embodiment according to the present invention.

FIG. 6A and FIG. 6B show still another example of game screen.

FIG. 6A shows a state where the user has made a selection determined to be of the second mode. The user has selected three characters 106*s*1 to 106*s*3 of the same type. The sizes of these characters are respectively size 2, size 3 and size 5.

FIG. 6B shows a state where the second process has been performed on the selection. Namely, the three characters 106*s*1 to 106*s*3 are synthesized and a character 106*t* of size 10 is displayed.

As in this example, a plurality of characters 106 including a character 106 of size 2 or greater may be synthesized and a character 106 having an increased size may be displayed.

In the above description on FIG. 3D, the character 106*s* of the unit size is erased. In the above description on FIG. 4D, the character 106*t* of size 5 is erased. In the case where the character 106*t* of size 10 shown in FIG. 6B is erased, it is preferred to add a point higher than a value obtained by multiplying the point added in FIG. 3D by 10 or a point higher than a value obtained by multiplying the point added in FIG. 4D by 2. In this manner, the user is motivated to synthesize the characters 106 regarded as being of the same type to generate a character 106 of a largest possible size.

Such an operation of synthesizing the characters 106 treated as being of the same type is not proposed in any conventionally known puzzle game and provides a surprise.

In the above, the basic operation of the game device 100 in this embodiment is described. The game device 100 in this embodiment allows the user to perform an operation of selecting and synthesizing a plurality of characters 106. In addition, the user is motivated to prepare a plurality of synthesized characters 106 and to erase the characters 106 within a predetermined time period. Such a structure is not proposed in a conventional puzzle game and provides a surprise.

<Structure of the Controller 200>

Figure 7:
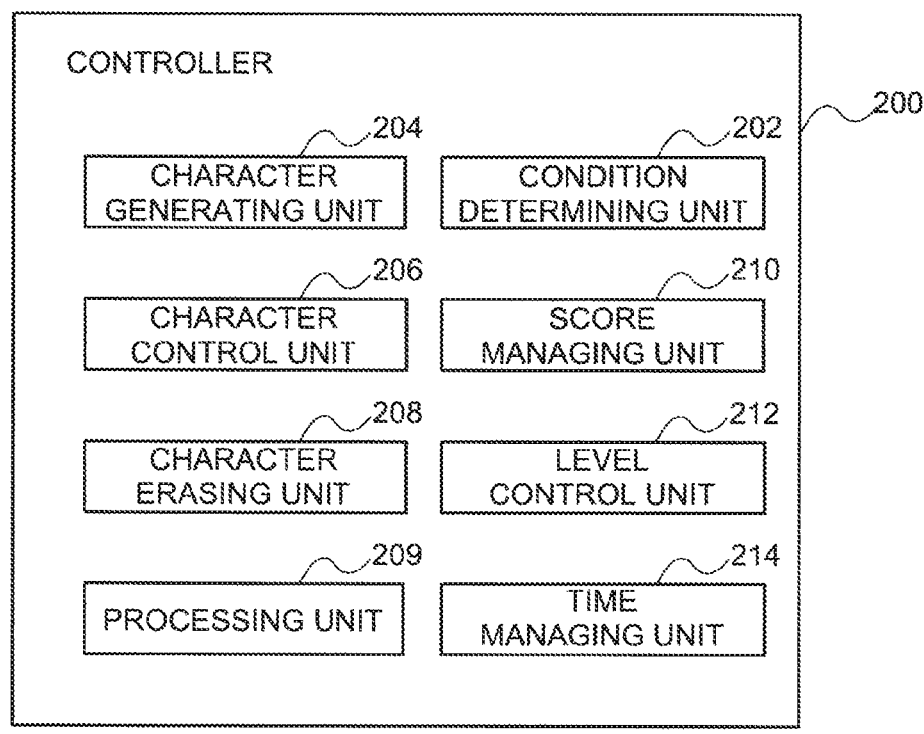
FIG. 7 shows a structure of a controller realized by execution of a program of a game in an embodiment according to the present invention.

FIG. 7 shows a structure of the controller 200 realized by executing a program of a game stored on the storage 300.

The controller 200 reads a program from the storage 300 storing the program of the game and executes the program. Based on an input from the user accepted by the touch sensor 420, the controller 200 allows the game to proceed while controlling motions of the plurality of characters 106 present in the movable region 104.

The controller 200 includes a condition determining unit 202, a character generating unit 204, a character control unit 206, a character erasing unit 208, a score managing unit 210, a level control unit 212, and a time managing unit 214.

The condition determining unit 202 determines whether the selection of the character 106 made by the user is of the first mode or of the second mode. The condition determining unit 202 also detects a plurality of signals, the interval between each two continuous signals of which is within a predetermined time period, and determines whether the selection is of the first mode or not based on each of the plurality of signals.

The character generating unit 204 supplies as supplements or generates a plurality of characters including characters of a plurality of types in the movable region 104 at a predetermined timing.

The "predetermined timing" encompasses, for example, immediately after the game is started. The character generating unit 204, for example, generates a random number at a timing of supplying the characters 106, and determines the type of the characters 106 to be supplied.

The "predetermined timing" further encompasses when at least one character 106 is erased in response to a selection determined to be of the first mode. In this embodiment, a character(s) 106 of the number in accordance with the number of the erased character(s) 106 and the size of each of the erased character(s) is(are) supplied. In this case, characters 106 of various types may be generated at substantially the same probability.

The "predetermined timing" further encompasses when the selected characters 106 are erased in response to a selection determined to be of the second mode. In this embodiment, a character 106 that has a size in accordance with the size and the number of the selected characters 106 and is treated as being of the same type as that of the selected characters 106 is generated.

The character control unit 206 causes the characters 106 present in the movable region 104 to move in the movable region 104 in accordance with a predetermined algorithm. A character 106 generated by the character generating unit is, for example, caused to fall downward in accordance with laws of physics at a predetermined initial rate from a predetermined initial position in the top portion of the movable region 104. The character control unit 206 also sets a repellence coefficient between a character 106 and a frame 104a of the movable region 104 or a repellence coefficient between the characters 106, and applies the set repellence coefficient to determine the motion after the collision by physics calculation. As a result, a manner of a character 106 falling from above and moving in the movable region 104 while colliding in repetition is expressed realistically.

The character control unit 206 may further change the initial rate, the repellence coefficient or the like of the character 106 in accordance with the type of the character 106, the score or the level of the user, or the like. For example, as the level of the user is higher, the initial rate may be higher and the repellence coefficient may be larger.

The character erasing unit 208 erases the selected character(s) 106 when the condition determining unit 202 determines that the selection made by the user is of the first mode or of the second mode.

A processing unit 209 performs the first process, the second process and the third process.

In the case where the condition determining unit 202 determines that the selection is of the first mode, the processing unit 209 performs the first process in accordance with the size and the number of the selected character. In the case where, for example, the first process is to add a point in accordance with the size and the number of the selected character, the processing unit 209 instructs the score managing unit 210 described below to add a predetermined point.

In the case where the condition determining unit 202 determines that the selection is of the second mode, the processing unit 209 performs the second process including newly displaying a character that has a size in accordance with the size and the number of the selected characters and is treated as being of the same type as that of the selected characters. In the case where a character that has a size in accordance with the size and the number of the selected characters and is treated as being of the same type as that of the selected characters is to be displayed, the processing unit 209 instructs the character generating unit 204 to perform the process.

In the case where a plurality of signals, the interval between each two continuous signals of which is within a predetermined time period, are detected and the selection is determined to be of the first mode based on each of the plurality of signals, the third process in accordance with the number of the plurality of detected signals and the size of the selected character is performed. In the case where, for example, a point in accordance with the number of the plurality of detected signals and the size of the selected character is to be added, the processing unit 209 instructs the score managing unit 210 described below to add a predetermined point.

The score managing unit 210 manages the score of the user. The score managing unit 210 adds a predetermined point when at least one character 106 is erased.

The level control unit 212 controls the level of the user. The level control unit 212 may determine the level of the user in accordance with the score of the user held by the score managing unit 210. The level control unit 212 may, for example, raise the level when the user acquires a predetermined score.

The time managing unit 214 manages the time of the game in a time-limited mode. In the time-limited mode, the competition is on the score within a predetermined time. Therefore, the time managing unit 214 counts the passage of time from the start of the game and terminates the game when the predetermined time lapses.

<Executable Processes>

With reference to the drawings, a process flow including processes executable by use of the functions described above will be described.

Figure 8:
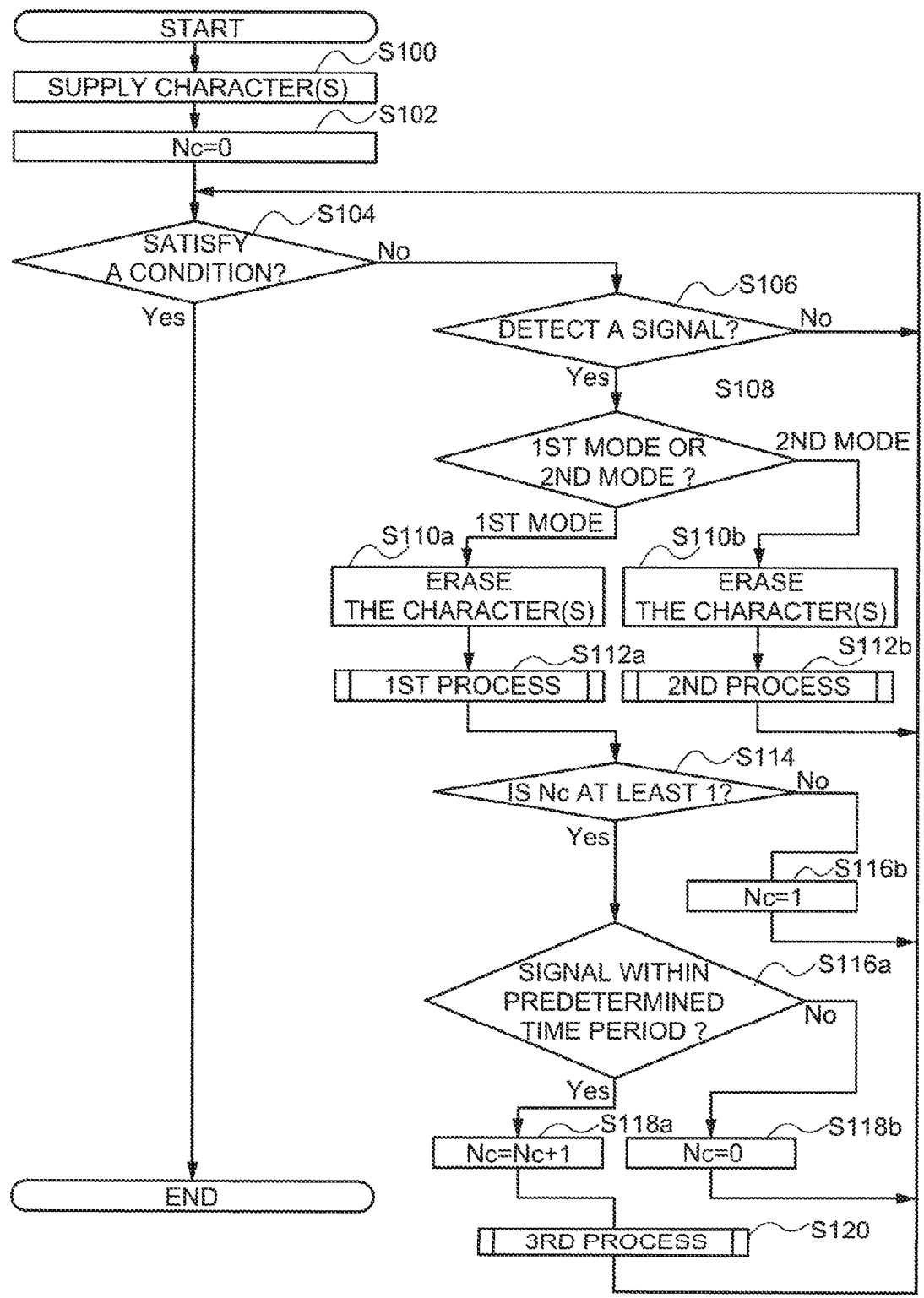
FIG. 8 shows processes executable by the game device in an embodiment according to the present invention.

FIG. 8 shows processes executable by the above-described functions.

At the start of the game, the character generating unit 204 supplies a plurality of characters 106 to the movable region 104 (S100).

Next, the parameter Nc is initialized to zero (S102). The parameter Nc represents a counted number of a plurality of signals, the interval between each two continuous signals of which is within a predetermined time period. There is no limitation on the order of S100 and S102, and S100 and S200 may be performed in an order opposite to the order shown in this example.

The condition determining unit 202 determines whether a condition to terminate the game is satisfied or not (S104). In this embodiment, for example, the time of the game is managed in the time-limited mode. When a predetermined time period lapses after the start of the game, it is determined that the condition to terminate the game is satisfied (S104; yes), and the game is terminated.

When it is within the predetermined time period after the start of the game (S104; no), the controller 200 is put into a wait state of waiting a signal indicating that the user has selected a character 106 (S106; no).

When the signal is detected (S106; yes), the condition determining unit 202 determines whether the selection made by the user is of the first mode or of the second mode based on the signal (S108).

In the case where the selection of the user is of the second mode (S108; second mode), first, the character erasing unit 208 erases the selected characters 106 (S110b). Then, the second process is performed (S112b). The second process includes a process, performed by the character generating unit 204, of newly displaying a character 106 that has a size in accordance with the size and the number of the selected and erased characters 106 and is treated as being of the same type as that of the selected and erased characters 106. When the second process is finished, the process flow returns to S104.

By contrast, in the case where the selection of the user is of the first mode (S108; first mode), first, the character erasing unit 208 erases the selected character(s) 106 (S110a). Then, the first process is performed (S112b). The first process may include a process of supplying a character(s) of a number in accordance with the number of the erased character(s) 106.

When the first process is finished, the condition determining unit 202 determines whether the parameter Nc is at least 1 or not (S114).

In the case where Nc is not at least 1 (S114; no), namely, Nc is 0, 1 is substituted for Nc (S116b), and the process flow returns to S104.

In the case where Nc is at least 1 (S114; yes), the condition determining unit 202 further determines whether the signal is output within a predetermined time period or not (S116a).

In the case where the signal is determined as not being output within the predetermined time period (S116a; no). Nc is initialized to 0 (S118b), and the process flow returns to S104.

In the case where the signal is determined as being output within the predetermined time period (S116a; yes). 1 is added to Nc (S118a).

Next, the third process is performed (S120). The third process is a process in accordance with Nc and the size of the selected character 106. When the third process is finished, the process flow returns to S104. In the third process, for example, as the value of Nc is larger, a higher point may be added. In this case, in order to obtain a high point, it is preferred to continuously perform a process of adding Nc (S118a) with no process of initializing Nc to 0 (S118b).

In the above, a process flow of the game in this embodiment is described. In this embodiment, the time of the game is managed in the time-limited mode. The present invention is not limited to this mode.

As a modification, the game may be played in a match-type mode with a virtual opponent being set. For example, damage in accordance with the point added for the user may be imposed on the virtual opponent, and when the accumulated damage imposed on the virtual opponent exceeds a predetermined value, the game may be finished with the user being the winner.

Preferable embodiments of the present invention have been described above. These embodiments are merely examples, and the technological scope of the present invention is not limited thereto. A person of ordinary skill in the art would make various alternations without departing from the gist of the present invention. Therefore, such alternations are to be construed as being encompassed in the technological scope of the present invention.

REFERENCE SIGNS LIST

100 . . . game device; 102 . . . display screen; 104 . . . movable range; 104a . . . frame; 104b . . . first side; 104c . . . second side; 106, 106a, 106b, 106c, 106d, 106e, 106s, 106t . . . character; 107 . . . space; 108 . . . bent line; 200 . . . controller; 202 . . . condition determining unit; 204 . . . character generating unit; 206 . . . character control unit; 208 . . . character erasing unit; 209 . . . processing unit; 210 . . . score managing unit; 212 . . . level control unit; 214 . . . time managing unit; 300 . . . storage; 400 . . . touch panel

What is claimed is:

1. A non-transitory computer-readable storage medium having a program stored thereon, the program causing a computer to:
   display a plurality of characters movable in accordance with a predetermined algorithm, the characters of the plurality of characters comprising one or more first characters and one or more second characters, the one or more first characters being of a first type of characters and the second characters being of a second type of characters different from the first type of characters;
   determine whether a selection of one or more of the characters of the plurality of characters is of a first mode or of a second mode based on a signal indicating the selection upon detection of the signal, the first mode indicating that a selected quantity of first characters included in the selection of the one or more characters is less than a predetermined number, and the second mode indicating that the selected quantity of the first characters included in the selection of the one or more characters is greater than or equal to the predetermined number; and
   erase the first characters included in the selection of the one or more characters and perform a first process when the selection is determined to be of the first mode, and erase the first characters included in the selection of the one or more characters and perform a second process when the selection is determined to be of the second mode,
   wherein
      the first process is performed in accordance with a first size of the first characters included in the selection of the one or more characters that is erased, and
      the second process includes displaying a third character that is of the first type of characters, the third character having a second size based on the first size and the quantity of the first characters included in the selection of the one or more characters that is erased.

2. The non-transitory computer-readable storage medium according to claim 1, wherein the program further causes the computer to:
   perform a third process when a plurality of signals having a predetermined interval between two signals are detected and the selection of the one or more characters is determined to be of the first mode, the third process being performed in accordance with a quantity of signals included in the plurality of signals and the first size of the first characters included in the selection of the one or more characters.

3. The non-transitory computer-readable storage medium according to claim 1, wherein the third character is displayed at a position based on a position of the first character last selected in the selection of the one or more characters as indicated by the signal based on which the selection of the one or more characters is determined to be of the second mode.

4. The non-transitory computer-readable storage medium according to claim 1, wherein the signal is output by continuously selecting first characters that are adjacent to each other.

5. The non-transitory computer-readable storage medium according to claim 1, wherein the first process further includes supplying, as a supplement, one or more first characters or one or more second characters corresponding to the quantity of the first type of characters included in the selection of the one or more characters that is erased.

6. The non-transitory computer-readable storage medium according to claim 1, wherein the one or more first characters and the one or more second characters move in a predetermined region.

7. The non-transitory computer-readable storage medium according to claim 6, wherein the predetermined algorithm includes a process of providing a gravitational force from a first side toward a second side of the predetermined region.

8. The non-transitory computer-readable storage medium according to claim 7, wherein at least one of the one or more first characters or at least one of the one or more second characters is supplied from the first side.

9. The non-transitory computer-readable storage medium according to claim 1, wherein the predetermined algorithm includes each of the one or more first characters or each of the one or more second characters elastically repelling.

10. The non-transitory computer-readable storage medium according to claim 1, wherein the first process is performed in accordance with the first size of the first characters included in the selection of the one or more characters that is erased and the quantity of the first characters included in the selection of the one or more characters that is erased.

11. A game device comprising:
a processor; and
a memory having a computer-readable program stored thereon that, when executed by the processor, causes the game device to:
display a plurality of characters movable in accordance with a predetermined algorithm, the characters of the plurality of characters comprising one or more first characters and one or more second characters, the one or more first characters being of a first type of characters and the second characters being of a second type of characters different from the first type of characters;
determine whether a selection of one or more of the characters is of a first mode or of a second mode based on a signal indicating the selection upon detection of the signal, the first mode indicating that a selected quantity of first characters included in the selection of the one or more characters is less than a predetermined number, and the second mode indicating that the selected quantity of the first characters included in the selection of the one or more characters is greater than or equal to the predetermined number; and
erase the first characters included in the selection of the one or more characters and perform a first process when the selection is determined to be of the first mode, and erase the first characters included in the selection of the one or more characters and perform a second process when the selection is determined to be of the second mode,
wherein
the first process is performed in accordance with a first size of the first characters included in the selection of the one or more characters that is erased, and
the second process includes displaying a third character that is of the first type of characters, the third character having a second size based on the first size and the quantity of the first characters included in the selection of the one or more characters that is erased.

12. The game device according to claim 11, wherein the program further causes the game device to:
perform a third process when a plurality of signals having a predetermined interval between two signals are detected and the selection of the one or more characters is determined to be of the first mode, the third process being performed in accordance with a quantity of signals included in the plurality of signals and the first size of the first characters included in the selection of the one or more characters.

13. The game device according to claim 11, the third character is displayed at a position based on a position of the first character last selected in the selection of the one or more characters as indicated by the signal based on which the selection of the one or more characters is determined to be of the second mode.

14. The game device according to claim 11, wherein the signal is output by continuously selecting first characters that are adjacent to each other.

15. The game device according to claim 11, wherein the first process further includes supplying, as a supplement, one or more first characters or one or more second characters corresponding to the quantity of the first type of characters included in the selection of the one or more characters that is erased.

16. The game device according to claim 11, wherein the one or more first characters and the one or more second characters move in a predetermined region.

17. The game device according to claim 16, wherein the predetermined algorithm includes a process of providing a gravitational force from a first side toward a second side of the predetermined region.

18. The game device according to claim 17, wherein at least one of the one or more first characters or at least one of the one or more second characters is supplied from the first side.

19. The game device according to claim 11, wherein the predetermined algorithm includes each of the one or more first characters or each of the one or more second characters elastically repelling.

20. The game device according to claim 11, wherein the first process is performed in accordance with the first size of the first characters included in the selection of the one or more characters that is erased and the quantity of the first characters included in the selection of the one or more characters that is erased.

* * * * *